United States Patent [19]

Fujii et al.

[11] 4,193,831

[45] Mar. 18, 1980

[54] WATER PROOFING COMPOSITIONS FOR CEMENT MORTAR OR CONCRETE AND METHOD EMPLOYING SAME

[75] Inventors: Toshihiro Fujii, Fukuyama; Sekiji Yokota, Fukayasu, both of Japan

[73] Assignee: Hayakawa Rubber Company Limited, Fukuyama, Japan

[21] Appl. No.: 846,051

[22] Filed: Oct. 27, 1977

Related U.S. Application Data

[63] Continuation of Ser. No. 668,114, Mar. 18, 1976, abandoned, which is a continuation of Ser. No. 537,014, Dec. 27, 1974, abandoned.

[30] Foreign Application Priority Data

Mar. 18, 1976 [JP] Japan .................................. 51-668114

[51] Int. Cl.$^2$ ................................................ C09J 5/00
[52] U.S. Cl. .................. 156/309; 52/309.17; 52/515; 52/408; 52/746; 156/71; 156/306; 156/334; 260/2.3; 260/33.6 AQ; 427/208.4; 427/403; 427/393.6; 428/451; 428/521; 428/538
[58] Field of Search .................. 156/306, 242, 41, 244, 156/71, 334, 304, 309; 427/207 B, 403, 385 C, 400; 106/33; 428/323, 500, 325, 521, 451, 538, 454, 420; 264/34, 133; 260/2.3, 33.6 AQ; 52/309.17, 515, 408, 746

[56] References Cited

U.S. PATENT DOCUMENTS

| | | | |
|---|---|---|---|
| 2,471,866 | 5/1949 | Eby | 260/2.3 |
| 2,484,060 | 10/1949 | Wing | 260/33.6 AQ |
| 2,541,498 | 2/1951 | Calvert | 156/306 |
| 2,582,795 | 1/1952 | Prentiss et al. | 260/42.37 |
| 2,778,807 | 1/1957 | Boggs et al. | 260/33.6 AQ |
| 2,783,213 | 2/1957 | Le Beau | 260/2.3 |
| 2,864,882 | 12/1958 | Snell | 428/451 |
| 3,287,197 | 11/1966 | Errede | 428/420 |
| 3,400,090 | 9/1968 | Maslow | 260/33.6 AQ |
| 3,522,119 | 7/1970 | Mori et al. | 156/71 |
| 3,536,562 | 10/1970 | Shipp et al. | 156/242 |
| 3,674,735 | 7/1972 | Callan | 260/33.6 AQ |
| 3,767,503 | 10/1973 | Maddelena | 260/33.6 AQ |
| 3,900,102 | 8/1975 | Hurst | 156/71 |
| 3,932,341 | 1/1976 | Kutch et al. | 260/33.6 AQ |

*Primary Examiner*—John T. Goolkasian
*Assistant Examiner*—J. J. Gallagher
*Attorney, Agent, or Firm*—Ladas, Parry, Von Gehr, Goldsmith & Deschamps

[57] ABSTRACT

Water proofing compositions containing a reclaimed butyl rubber of used inner tube scraps as the active component have a high adhesion to cement mortar or concrete and are used for water proofing materials in buildings and civil engineering works.

3 Claims, No Drawings

WATER PROOFING COMPOSITIONS FOR CEMENT MORTAR OR CONCRETE AND METHOD EMPLOYING SAME

This is a continuation, of application Ser. No. 668,114 filed Mar. 18, 1976, now abandoned, which is a continuation of Ser. No. 537,014, Dec. 27, 1974, now abandoned.

The present invention relates to water proofing compositions, the active component of which is reclaimed butyl rubber of butyl rubber scraps and which are utilized for water proofing or stopping materials, joint materials and the other materials for buildings and civil engineering works.

The compositions of the present invention contain the reclaimed butyl rubber as the active component and further defined kinds and amounts of thermoplastic resins, softening oils, fillers, tackiness adjusting agents, antioxidants, and solvents and are non-crosslinkable and maintain a tacky state. These compositions are prepared into a liquid form, a fluid form or a plastic form having a desired hardness, a desired consistency or a desired viscosity, and are used alone or in laminates and the other various forms, for example, solid sheet form, ribbon form, strip form and the like.

It has been found that the compositions have a remarkable function that they have a high adhesion to freshly mixed mortar and when freshly mixed cement mortar (wet) housing the composition of the present invention is cured and hardened, the dried and hardened mortar adheres and integrates with the composition. The compositions can be applied to construction joints and expansion joints of concrete or mortar upon making surface waterproofing or underground construction and utilized for the same object in roads, ports and dams. Furthermore, the compositions can be used for improvement of applying ceramic tiles and improvement of constructing walls of wood prefabrication house. In the latter case, the composition of the present invention is applied on plywoods and then the thus treated plywoods are provided on the wall portion, after which, a color cement resin mortar is sprayed thereon.

The particular function of the compositions of the present invention provides novel workings which can entirely change the conventional working and the compositions can completely prevent the leakage of water and greatly reduce the working labor cost. Furthermore, the inner tube scraps collected from cars can be effectively utilized and the present invention is very useful.

For surface water proofing of cement mortar, the following processes have been known.

(1) Laminating of bituminous materials, such as asphalt, tar and the like.
(2) Applying of a mixed resin of Portland cement and a polymer emulsion.
(3) Coating of one or two liquids of polymer solutions of neoprene, Hypalon (chlorosulfonated polyethylene) and polyurethane.
(4) Sticking of sheet roofing of vulcanized synthetic high molecular weight substances, such as butyl rubber, neoprene, Hypalon, EPT and the like.

However, these processes have some drawbacks in the performance, cost, workability and the like.

That is, the above described process (1) is the main process but the tar must be melted by firing and the laminating must be effected in several layers, so that the labor cost is higher.

In the above described process (2), the applied resin is poor in the adhesion to the old mortar and cracks are caused owing to the expansion and shrinkage of mortar.

In the above described process (3), the skin is thin, so that pinholes are liable to be formed upon the working and the coating is nonuniform and in the chemical reaction type of two liquids, the temperature upon the working greatly influences and a severe control upon working is required.

In the above described process (4), the polarity of the vulcanized rubber sheet roofing is low and the adhering of the mutual sheets is difficult, so that the bonding and integrating of lap portions of the sheets are difficult and further the sheets cannot adapt expansion and shrinkage due to the temperature difference of the concrete structures and the drying and hardening of cement mortar after the working and the adhesion breakage is caused from the lap portion and the water leakage is apt to be caused.

In the general water proofing working, except for the exposed water proofing where a load is not relatively applied, a protective layer composed of Portland cement compound, such as mortar is provided on the water proofing layer in order to endure the walking and the other load but any water proofing layer does not adhere and integrate with the Portland cement compound, such as mortar and therefore the protective layer having a thickness of more than 30 mm must be applied and the weight of the building becomes larger. In addition, cracks are caused due to the drying shrinkage of the mortar.

In the exposed water proofing, a protective coating is generally applied. When the walking load is not great, the cement mortar protective layer to be applied on the waterproofing layer may be thin but an "inflation phenomenon" is readily caused in the polymer sheet roofings due to temperature variation of sunshine, so that the adhesion between mutual sheet roofings or between said roofing and the base concrete is improtant.

The vulcanized polymer sheet roofing or the water proofing process by means of a polymer coating, which has been heretofore used for the expose water proofing, is expensive, so that the thickness of said roofing or coating is about 0.1 mm and thin.

As the conventional expansion joints of concrete structures, even if a water stopping material, such as vulcanized rubber of polyvinyl chloride (PVC) is inserted into a freshly mixed mortar (wet), said water stopping material does not adhere and integrate with the freshly mixed mortar (wet) when said mortar is dried and hardened. Accordingly, the expansion joints having the satisfactory properties have neven been obtained. Thus, the previously hardened cement mortar is cut by a concrete cutter or a joint plate is previously inserted into the cement mortar and after said cement mortar is hardened, the joint plate is pulled out and then into the resulting gap is injected a heated bituminous compound or two liquid caulking material of polyurethane-Thiokol and the like as an elastic sealant to provide a cushionable portion for the expansion and shrinkage of the concrete or mortar. In this case, in order to supplement the adhesion, a liquid or fluid polymer caulking material may be used together. Alternatively, a molded water stopping material (for example, vulcanized rubber, PVC) or a sponge-shaped molding is used but in any case, the adhesion of said molding to the mortar is poor and is not satisfied. Accordingly, said molding cannot adapt to the expansion and shrinkage of the concrete and therefore where the water pressure is applied at an underground, the water leakage cannot be avoided and a secondary repair is always carried out.

The object of the present invention to is provide the compositions which can obviate these drawbacks of the surface water proofing and the joint working and the active component of the compositions is the reclaimed butyl rubber produced from the used butyl rubber inner tube scraps and the compositions have a high adhesion to cement mortar.

The present invention includes the following four compositions, which are homogeneous mixtures of the defined amount of reclaimed butyl rubber, an inorganic filler, an antioxidant, a softening agent, a synthetic rubber, a thermoplastic synthetic resin and/or isobutylene low polymer, a solvent and the like and have given ranges of hardness (JIS hardness tester), consistency (JIS K-2530 penetrometer) and viscosity, which are suitable for respective use and application.

COMPOSITION A

This is a homogeneous mixture of 65–40% by weight of reclaimed butyl rubber of butyl rubber scrap, 30–50% by weight of an inorganic filler, a synthetic rubber, an antioxidant, and a softener and has a hardness of 30–70 (JIS hardness tester).

COMPOSITION B

This is a homogeneous mixture of 35–15% by weight of reclaimed butyl rubber of butyl rubber scrap, 40–50% by weight of an inorganic filler, 20–35% by weight of a thermoplastic synthetic resin and/or low polymerized isobutylene and a softener and has a consistency (JIS K-2530 penetrometer) at 25° C. of 50–100.

COMPOSITION C

This is a homogeneous mixture of 5–14% by weight of reclaimed butyl rubber of butyl rubber scrap, 50–60% by weight of an inorganic filler, 15–20% by weight of a thermoplastic synthetic resin and/or low polymerized isobutylene, 10–20% by weight of a solvent and a softener and has a consistency (JIS K-2530 penetrometer) at 25° C. of 200–400.

COMPOSITION D

This is a homogeneous mixture of 10–20% by weight of reclaimed butyl rubber of butyl rubber scrap, 5–15% by weight of an inorganic filler, 1–15% by weight of a thermoplastic synthetic resin and a solvent and has a viscosity (Brookfield viscometer cps) at 25° C. of 100–2,000.

The constitution and merits of the compositions of the present invention will be explained in the hereinafter mentioned description.

The compositions A–D of the present invention have the following states.

COMPOSITION A

This composition is rolled by rollers into a sheet form and has a self-tackiness.

COMPOSITION B

This composition is molded by an extruder into a sheet form or desired shapes and has a high tackiness.

COMPOSITION C

This composition is used for a caulking material and has a fluidity.

COMPOSITION D

This composition can be used as a primer and has a property of pressure-sensitive adhesive.

As seen from the above description, the composition A is a solid sheet form and has tackiness and minimum softness, while the composition D has the maximum limit of liquid state.

The compositions A, B, C and D have the properties as shown in the following Table 1.

Table 1

| Composition Properties | A | B | C | D |
|---|---|---|---|---|
| Hardness (JIS hardness tester) | 30–70 | | | |
| Consistency (JIS K-2530 Penetrometer at 25° C) | | 50-100 | 200–400 | |
| Viscosity cps at 25° C. Brookfield viscometer | | | | 100–2,000 |

COMPOSITION A

In Instron tension tester:
  Tensile strength: 5–20 Kg/cm²
  Tear strength: 5–15 Kg/cm²
  Elongation: 300–800%
  Adhesion to mortar: 2,000–4,000 g/cm²

COMPOSITION B

Adhesion to cement mortar:
  Maximum stress (g), 300–3,000,
  Compression strength (g), 500–4,000.

COMPOSITION D

Sample: A sheet of composition A is adhered to a dried hardened cement mortar with this composition.
Peeling test at 180°: 2,000–4,000 g/in (Instron type tester)

The test of adhesion of the compositions A and B to cement mortar was effected as follows.

In the composition A, a standard mortar prepared by following to JIS R5210 was applied on a test piece of the composition A in a thickness of 30 mm and 20 mm and the resulting assembly was cured in a chamber having a temperature of 20° C. and a relative humidity of 80% for 7 days and the hardened mortar was cut in a dimension of 50 mm (width)×100 mm (length) until reaching the composition A layer. A steel attachment of 50 mm×100 mm was bonded thereto with an epoxy resin adhesive and then the thus treated test piece was left to stand and cured in a chamber maintained at 25° C. for 24 hours. Then an adhesive force was determined by peeling the test piece perpendicularly to the adhered surface. The tensile test was carried out by means of the simple tensile tester of the Building Laboratory in the Ministry of Construction, Japan.

In the composition B, the standard mortar prepared following to JIS R5210 was applied on both sides of a sample piece of the composition B having a thickness of 10 mm and an area of 35 mm×55 mm and the resulting assembly was cured in a chamber having a temperature of 20° C. and a relative humidity of 80% for 7 days and then the hardened mortar was tested by the Instron tension tester.

In these tests, when gypsum was used instead of the mortar, the same results were obtained. While, when the same test was made with respect to a vulcanized rubber sheet or a polyvinyl chloride sheet, these sheets did not adhere to the mortar.

As shown in the above Table 1, the compositions A–D have the required properties.

The following Table 2 shows the constitution ranges of typical embodiments of the compositions A–D by the weight parts and the numeral values in the parenthesis shown % by weight.

they are preferable in order to maintain the form and to obtain a certain specific gravity.

The tackiness promoter includes thermoplastic resins and saturated low molecular weight polymers. The thermoplastic resins are ones derived from petroleum, such as terpene polymerized resin, hydrogenated resin, cumarone resin, xylene resin and the like. Among them, terpene polymerized resin and hydrogenated resin are preferable. The saturated low molecular weight polymers are, for example, polyisobutylene having a molecular weight of 5–300.

The above described tackiness promoters have a high compatibility with the reclaimed butyl rubber and an important role for the compositions B, C and D, but an excess amount should not be used, because the agglomeration of the compositions is greatly reduced.

The softener makes the dispersion of the filler and the

Table 2

|  | Component | A | B | C | D |  |
|---|---|---|---|---|---|---|
| Main polymer | Reclaimed butyl rubber | 100 (61–42) | 100 (34–18) | 100 (11–7) | 100 (18–12) |  |
|  | Processing polymer | 5–20 (3–9) |  |  |  |  |
| Filler | Calcium carbonate | 50–100 | 100–200 | 300–400 | 10–30 |  |
|  | Aluminum hydrosilicate | 5–10 |  | 10–20 |  |  |
|  | Zinc oxide | 55–110 | 130–280 | 530–780 | 35–90 | 5–10 |
|  | Asbestos | (34–46) | (44–49) | (57–53) | (6–11) |  |
|  | Hard clay |  | 30–80 |  |  |  |
|  | Talc |  |  | 20–60 |  |  |
|  | Blown asphalt (Bitumene) |  |  |  | 20–50 |  |
| Tackiness promoter | Thermoplastic resin |  | 60–180 (20–31) | 10–50 | 150–280 (16–19) | 100–200 | 20–100 (4–13) | 20–100 |
|  | Saturated low molecular weight polymer |  |  | 50–130 |  | 50–80 |  |
| Softener | Aromatic oil |  | 1–5 |  |  |  |  |
|  | Aliphatic oil | 1–5 |  | 3–10 | 3–10 | 20–50 | 20–50 |
| Antioxidant | Wax | 0.5–1.5 | 0.5–1.5 |  |  |  |  |
| Solvent | n-Hexane |  |  |  |  | 405–510 | 200–250 |
|  | Gasoline |  |  |  |  |  | 200–250 |
|  | Methanol |  |  |  | 130–250 |  | 5–10 |
|  | Naphtha |  |  |  | (14–17) | 30–50 |  |
|  | Toluene |  |  |  |  | 100–200 |  |
| Total |  | 161.5–237 | 293–570 | 930–1,460 | 560–800 |  |

As shown in the above Table 2, the compositions A–D are constituted of the accessary components and amounts in order to attain the required properties. An explanation will be made with respect to the components to constitute the compositions.

The active component is the reclaimed butyl rubber and in the composition A, it is preferable that a processing polymer, such as ethylene propylene terpolymer or polybutadiene rubber, is used together with the reclaimed butyl rubber in order that the composition A is easily separated from rollers when said composition is rolled by rollers and that the weather resistance is improved.

In all the compositions A–D, the reclaimed butyl rubber gives the tackiness. The viscosity of the reclaimed butyl rubber composing the compositions A and B has a value of 60±5 ML/212° F./4 minutes (large rotor of mooney viscomotor), and the viscosity of the reclaimed butyl rubber composing the compositions C and D has a value of 40±5.

The filler includes various substances and is selected considering the handling of the resulting composition and the economy. For example, aluminum hydrosilicate and hard clay are high in the oil absorbing property and increase the hardness and reduce the tackiness, so that these substances cannot be used in a large amount, but like at the original stage of preparing the compositions easy and therefore is used for controlling the softness of the compositions but the aromatic oils are superior in the effect to the aliphatic oils. In general the amount of the softener used should be the lower limit.

The antioxidant is contained when the composition of the present invention is particularly used for the exposed water proofing workings.

In the solvent, the aromatic solvents are higher in the compatibility as in the softener. The composition C is injected by a caulking gun and it is taken into account that the "volume reduction" of the coated film is possibly small. The use together of a small amount of a nonsolvent of alcohol lowers the absolute viscosity and contributes to improvement of the workability and performance.

Since the compositions of the present invention have tackiness and have not been vulcanized, they are sensitive to temperature. The constitution of each of the compositions is selected depending upon the temperature upon working, the desire of users, the application and the like.

An explanation will be made with respect to the reason of the definition of the amount of the components in the compositions A–D.

COMPOSITION A

When the amount of the reclaimed butyl rubber of this composition exceeds 65% by weight, the tackiness increases but the hardness lowers, while when said amount is less than 40% by weight, the hardness is too large and the tackiness lowers. When the amount of the filler exceeds 50% by weight, the hardness is too large, while when said amount is less than 30% by weight, the desired hardness is not obtained.

COMPOSITION B

When the amount of the reclaimed butyl rubber exceeds 35% by weight, the tackiness increases but the defined consistency cannot be obtained, while when said amount of less than 15% by weight, the defined consistency also cannot be obtained. Furthermore, when the amount of the inorganic filler exceeds 50% by weight, the hardness is too large and the consistency also is too large, while when said amount is less than 40% by weight, the desired consistency cannot be obtained. Furthermore, when the amount of the thermoplastic synthetic resin and/or the low molecular weight polymer of isobutylene exceeds 35% by weight, the agglomeration of the composition lowers and the defined consistency cannot be obtained, while when said amount is less than 20% by weight, the defined consistency also cannot be obtained.

COMPOSITION C

When the amount of the reclaimed butyl rubber exceeds 14% by weight, the tackiness increases but the defined consistency cannot be obtained, while when said amount is less than 5% by weight, the defined consistency also cannot be obtained. When the amount of the filler exceeds 60% by weight, the hardness is too large and the defined consistency is not obtained, while when said amount is less than 50% by weight, the defined consistency also cannot be obtained. Furthermore, when the amount of the thermoplastic synthetic resin and/or the low molecular weight polymer of isobutylene exceeds 20% by weight, the agglomeration of the composition lowers and further the defined consistency cannot be obtained, while when said amount is less than 15% by weight, the defined consistency cannot be obtained. When the amount of the solvent exceeds 20% by weight and said amount is less than 10% by weight, the defined consistency cannot be obtained.

COMPOSITION D

When the amount of the reclaimed butyl rubber exceeds 20% by weight, the tackiness increases but the defined viscosity cannot be obtained, while when said amount is less than 10% by weight, the defined viscosity also cannot be obtained. When the amount of the filler exceeds 15% by weight, the viscosity increases and is not within the defined range, while when said amount is less than 5% by weight, the viscosity lowers and is not within the defined range. Furthermore, when the amount of the thermoplastic synthetic resin and/or the low molecular weight polymer of isobutylene exceeds 15% by weight, the agglomeration of the composition lowers and the viscosity increases and is not within the defined range, while when said amount is less than 1% by weight, the viscosity is not within the defined range.

The compositions A-D of the present invention can be used for various applications, for example, water proofing sheets, water stopping joint materials, caulking materials, constitution materials for the outer portion (wall, etc.) of buildings and the like and about twenty applications may be developed. The embodiments of these applications are listed hereinafter.

The compositions A-D correspond to those disclosed in Tables 1 and 2. The compositions A-D can be used alone or in combination and further these compositions may be used in combination with other materials as explained hereinafter.

Table 3

| Product No. | Construction | Remarks |
|---|---|---|
| | Non-vulcanized high polymer roofings | |
| 1 | A alone | Water proofing sheet of 1.0-3.0mm × more than 1,000cm. These sheets are adhered on the concrete to be water-proofed with an adhesive. |
| 2 | A + D | On the composition A sheet is applied the composition D as an adhesive. The form is similar to the product No. 1. |
| 3 | A + B | A laminate of the composition A sheet (thickness of more than 1.0mm) and the composition B sheet (1.0-1.5mm × more than 1,000cm). Applying on the concrete having a large movement. |
| 4 | B alone | Sheet of more than 1.0mm(thickness) × more than 1,000cm (breadth). Applying to the places where the influence of sun shine is little or walking is not made. |
| | Composite high polymer roofings | |
| 5 | Vulcanized polymer sheet roofing+A+D | The form is similar to the product No. 2. A vulcanized polymer sheet roofing is laminated on the product No. 2. The surface layer is the vulcanized polymer sheet roofing and hard, so that walking can be made on this roofing. |
| 6 | Vulcanized polymer sheet roofing+B | The form is similar to the product No. 5. This product is used when the adhesion to the concrete to be treated is required and the concrete is movable. |
| 7 | Polymer coating roofing+A | A hardenable resin, such as polyurethane is coated on the composition A sheet. |
| 8 | Porous material A+D | The form is similar to the product No. 2. The porous material is polyethylene foam, polyurethane foam, asbestos, glass fiber. Heat insulating roofing. |
| 9 | Porous material+B | This product is similar to the product No. 8. Heat insulating roofing. |
| 10 | Fibrous material+B | The form is similar to the product No. 4. A laminate of the composition B sheet with asphalt felt or jute felt. |
| | Molded or injecting sealing materials | |
| 11 | B alone | The form is similar to the product No. 4. Ribbon, strip and the other shaped extruded products. This product is inserted in a freshly mixed mortar (wet) or is used as a joint for ALC, RC and the like. |
| 12 | Various aggregates+B | The form is similar to the product No. 11. This product is used in combination with metal, plastic, rubber plate or foam in view of workability or structure plan. |
| 13 | B+C | The form is similar to the product No. 11. This product is used for old joint portions other than insertion of freshly mixed mortar (wet). |
| 14 | Various aggregates +B+C | The form and using process are similar to the product No. 13. The breadth of joint is uneven, so that it is preferable to use together with a fluid injecting caulking material. |
| 15 | B+the other | The form is similar to the product |

Table 3-continued

| Product No. | Construction | Remarks |
|---|---|---|
|  | polymer caulking materials | No. 11. The other caulking materials are, for example, polyurethane, epoxy, Thiokol resin, asphalt. |
| 16 | Various aggregates +B+the other polymer caulking materials | The form is similar to the product No. 12. The using process is similar to that of the product No. 15. |
| 17 | C alone | This product is used as an injection caulking. |

Material for constituting outer portions of buildings

| 18 | Materials for constituting outer portions of buildings +A or B | A unique development in use. On both sides of the composition A sheet are applied the composition D and on the one side is bonded ceramic tiles, face papers of face plates. The resulting assembly is placed opposing to the hardened mortar cement on the wall to be provided with said ceramic tiles, face papers or face plates, by a supporting frame and freshly mixed mortar (wet) is charged between the space of said assembly and the hardened mortar wall and cured. |
| 19 | Plywood+D or B or C | This product is used for wood prefabrication houses. For example, on one side of a plywood is applied the composition D, B or C and the resulting assembly is provided on a wall of a house and then a cement mortar or a synthetic resin mortar is sprayed thereon. Then, the applied composition D, B or C side can be bonded to said mortar simply. The labors, workings for applying asphalt paper and metal lath can be omitted. |

Adhesive

| 20 | D alone | This product is used as a pressure-sensitive adhesive or a primer. |

As seen from the above Table 3, the compositions A–D of the present invention have very broad applications. The product Nos. 1–4, No. 11, No. 13, No. 17 and No. 20 show the use of the compositions A–D, alone or in combination.

In any case, the high adhesion of the reclaimed butyl rubber to the cement mortar is utilized. Particularly, the product Nos. 18 and 19 are unique applications of the compositions of the present invention and the labor for making building structures can be greatly omitted.

A further explanation will be made with respect to the examples of the above described compositions A–D in more detail. In these examples, the numeral values of the recipe show "part by weight" and the numeral values in the parenthesis show "% by weight".

EXAMPLES OF THE COMPOSITION A

Table 4

|  | Example 1-1 | Example 1-2 | Example 1-3 |
|---|---|---|---|
| Reclaimed butyl rubber (Made by Hayakawa Rubber Co.) | 100 (60.3) | 100 (51.5) | 100 (43.3) |
| Butyl rubber JSR 035 (Made by Nippon Butyl Co.) | 10 (6) | — | — |
| EPDM Mitsui EPT #1045 (Made by Mitsui Petroleum Chemical Co.) | 5 (3) | 10 (5) | 15 (6.5) |
| Calcium carbonate | 50 (30.1) | 75 (39) | 100 (43.3) |
| Aluminum hydrosilicate | — | 5 | 10 |

Table 4-continued

|  | Example 1-1 | Example 1-2 | Example 1-3 |
|---|---|---|---|
| Antioxidant Suntite S (Made by Seiko Chemical Co.) | 1.0 (0.6) | 1.0 (2.5) (0.5) | 1.0 (4.3) (0.4) |
| Process oil AH-10 (Heavy aromatic process oil) | — | 3.0 (1.5) | 5.0 (2.2) |
| Total | 166 (100) | 194 (100) | 231 (100) |
| Physical properties |  |  |  |
| Tensile strength TSB (Instron tension tester) (Kg/cm$^2$) | 5.0 | 10 | 15 |
| Elongation ELB (Instrom tension tester) (%) | 750 | 500 | 350 |
| Tear resistance (Instron tension tester) (Kg/cm) | 4.5 | 8.3 | 13.3 |
| Hardness H (JIS) | 35 | 50 | 65 |
| Adhesion to mortar (Kg/cm$^2$) | 2,010 | 3,200 | 3,100 |

Any of the compositions in these examples were excellent in the adhesion to cement mortar and the water proofing property and the remarkable effect of the present invention was recognized.

EXAMPLES OF THE COMPSOTION B

Table 5

|  | Example 2-1 | Example 2-2 | Example 2-3 |
|---|---|---|---|
| Reclaimed butyl rubber (Made by Hayakawa Rubber Co.) | 100 (33) | 100 (22.6) | 100 (17.5) |
| Calcium carbonate | 100 (33) | 150 (33.9) | 200 (35.1) |
| Terpene polymerized resin YS-PX-1150 (Made by Yasuhara Fat Oil Co.) | 20 (6.5) | 35 (8) | 50 (8.8) |
| Light process oil Diana Process KL-1 (Made by Idemitsu Kosan Co.) | 3 (1.0) | 7 (1.6) | 10 (1.8) |
| Clay | 30 (10.0) | 50 (11.3) | 80 (14.0) |
| Low polymeric polyisobutylene Polybutene HV-3000 (Made by Nippon Petroleum Chemical Co.) | 50 (16.5) | 100 (22.6) | 130 (22.8) |
| Total | 303 (100) | 442 (100) | 570 (100) |
| Physical properties |  |  |  |
| Consistency (JIS K2530) | 55 | 100 | 80 |
| Adhesion (Instron tension tester) (g/cm$^2$) | 1,650 | 1,010 | 300 |
| Compression strength (Instron tension tester) (g/cm$^2$) | 2,000 | 1,450 | 550 |

Any of the compositions in these examples were excellent in the adhesion to cement mortar and the water proofing property and the remarkable effect of the present invention was recognized.

EXAMPLES OF THE COMPOSITION C

Table 6

|  | Example 3-1 | Example 3-2 | Example 3-3 |
|---|---|---|---|
| Reclaimed butyl rubber (Made by Hayakawa Rubber Co.) | 100 (10.7) | 100 (8.4) | 100 (6.8) |
| Calcium carbonate | 300 | 350 | 400 |

Table 6-continued

|  | Example 3-1 | Example 3-2 | Example 3-3 |
|---|---|---|---|
|  | (32.3) | (29.4) | (27.4) |
| Talc | 20 | 40 | 60 |
|  | (2.2) | (3.4) | (4.2) |
| Process oil Diana Process KL-1 (Made by Idemitsu Kosan Co.) | 20 (2.2) | 30 (2.5) | 50 (3.4) |
| Low polymeric polyisobutylene Polybutene HV-3000 (Made by Nippon Petroleum Chemical Co.) | 50 (5.4) | 65 (5.4) | 80 (5.5) |
| Asbestos | 200 (21.5) | 250 (21.0) | 300 (20.5) |
| Aluminum hydrosilicate | 10 (1.1) | 15 (1.3) | 20 (1.4) |
| Terpene polymerized resin YS-PX-1150 (Made by Yasuhara Fat Oil Co.) | 100 (10.7) | 150 (12.6) | 200 (13.7) |
| Toluene | 100 (10.7) | 150 (12.6) | 200 (13.7) |
| Naphtha | 30 (3.2) | 40 (3.4) | 50 (3.4) |
| Total | 930 (100) | 1,190 (100) | 1,460 (100) |
| Physical properties |  |  |  |
| Consistency (JIS K2530) | 380 | 350 | 210 |
| Slump m/m | 2.0 | 1.0 | 0 |
| Adhesion | OK | OK | OK |

Any of the compositions in these examples were excellent in the adhesion to cement mortar and the water proofing property and the remarkable effect of the present invention was recognized.

EXAMPLES OF THE COMPOSITION D

Table 7

|  | Example 4-1 | Example 4-2 | Example 4-3 |
|---|---|---|---|
| Reclaimed butyl rubber (Made by Hayakawa Rubber Co.) | 100 (17.5) | 100 (15.9) | 100 (12.5) |
| Zinc oxide | 5 (0.9) | 10 (1.6) | 10 (1.3) |
| Calcium carbonate | 10 (1.8) | 20 (3.2) | 30 (3.8) |
| Terpene polymerized resin YS-PX-1150 (Made by Yasuhara Fat Oil Co.) | 30 (5.3) | 50 (7.9) | 80 (10) |
| Low polymeric polyisobutylene Polybutene HV-3000 (Made by Nippon Petroleum Oil Co.) | — | 10 (1.6) | 20 (2.5) |
| Asphalt (Bitumene) | 20 (3.5) | 35 (5.6) | 50 (6.2) |
| n-Hexane | 200 (35.1) | 200 (31.7) | 250 (31.2) |
| Gasoline | 200 (35.1) | 200 (31.7) | 250 (31.2) |
| Methanol | 5 (0.9) | 5 (0.8) | 10 (1.3) |
| Total | 570 (100) | 630 (100) | 800 (100) |
| Physical properties |  |  |  |
| Viscosity cps 20° C. (Brookfield viscometer) | 800 | 1,200 | 100 |
| Non-volatile matter % | 29 | 36 | 36 |
| Adhesion g/in | 2,500 | 3,500 | 3,000 |

Table 7-continued

|  | Example 4-1 | Example 4-2 | Example 4-3 |
|---|---|---|---|
| (Instron tension tester) |  |  |  |

The shrinkage caused when the concrete buildings or engineering constructions is dried and hardened, is always more than $10^{-4}$ and cracks are caused when any restriction is subjected thereto. For obviating this drawback, a variety of means have been adopted and the compositions of the present invention are very useful and economic for solving this drawback.

All the compositions of the present invention have weather resistance and tackiness and readily bond to concrete and further bond to the other materials, for example, polyethylene foam, vulcanized rubber roofings and the like.

The most important merit of the present invention is that the compositions adhere and integrate with the freshly mixed mortar (wet) and this merit has developed various applications. Furthermore, the protective mortar layer in the waterproofing workings can be made light weight and a great merit is provided to building plan. Furthermore, when the composition sheet of the present invention is applied on the concrete, said sheet adapts and endures expansion and shrinkage of the concrete and any of the conventional waterproofing sheets do not have such merit.

As the active component of the compositions of the present invention, a rubber which is obtained in the course of the regeneration of butyl rubber scraps can be used other than the reclaimed butyl rubber.

The compositions of the present invention can adhere and integrate with gypsum other than cement mortar or concrete, so that the compositions can be used for the gypsum workings.

What is claimed is:

1. A method of water-proofing hardened cement mortar or concrete comprising the steps of making a homogeneous mixture consisting essentially of 65–40% by weight reclaimed butyl rubber, 30–50% by weight filler, a softener and an antioxidant; rolling said mixture into a sheet having a hardness of 30–70, applying an adhesive on the hardened cement mortar or concrete, placing said sheet on the applied adhesive to adhere said sheet to said hardened cement mortar or concrete to form a water proofing roofing and applying wet mortar or concrete on said sheet to adhere said wet mortar or concrete to said sheet.

2. A method of water-proofing cement mortar and concrete as claimed in claim 1, wherein said adhesive is a bonding material having a viscosity (Brookfield viscometer) at 25° C. of 100–2,000 cps, which comprises 10–20% by weight of reclaimed butyl rubber, 5–15% by weight of a filler, 1–15% by weight of at least one of a thermoplastic synthetic resin and a low molecular weight polymer of isobutylene and a solvent.

3. A water-proofing roofing sheet to be used in contact with wet cement mortar or wet concrete and having adhesion to the wet cement mortar or wet concrete without employing additional bonding materials and having a hardness of 30–70 (JIS hardness tester), which essentially consists of 65–40% by weight of reclaimed butyl rubber, 30–50% by weight of a filler, a softener and an antioxidant.

* * * * *

UNITED STATES PATENT AND TRADEMARK OFFICE
CERTIFICATE OF CORRECTION

PATENT NO. : 4,193,831
DATED : March 18, 1980
INVENTOR(S) : FUJII, Toshihiro et al.

It is certified that error appears in the above–identified patent and that said Letters Patent are hereby corrected as shown below:

> Under "[30] Foreign Application Priority Data",
> amend "Mar. 18, 1976 [JP] Japan ..... 51-668114"
> to -- Jun. 15, 1974 [JP] Japan ..... 49-68453 --.

Signed and Sealed this

Second Day of December 1980

[SEAL]

Attest:

SIDNEY A. DIAMOND

Attesting Officer

Commissioner of Patents and Trademarks